United States Patent [19]

Zorabedian

[11] Patent Number: 5,748,313
[45] Date of Patent: May 5, 1998

[54] SIGNAL-TO-NOISE RATIO OF SECOND HARMONIC INTERFEROMETERS

[75] Inventor: Paul Zorabedian, Mt. View, Calif.

[73] Assignee: Hewlett-Packard Company, Palo Alto, Calif.

[21] Appl. No.: 746,683

[22] Filed: Nov. 14, 1996

[51] Int. Cl.$^6$ .................................................... G01B 9/02
[52] U.S. Cl. ........................... 356/345; 356/349; 356/352
[58] Field of Search .................................... 356/345, 351, 356/358, 349, 352

[56] References Cited

U.S. PATENT DOCUMENTS 5,404,222  4/1995  Lis ............................................. 356/349

OTHER PUBLICATIONS

Stepper Overlay Performances Measurements Using the Air Turbulence Compensated Interferometer by Philip D. Henshaw, Sparta, Inc., proceedings of the SPIE (The International Society for Optical Engineering Conference), vol. 2726, pp. 809–820, Mar. 13–15, 1996.

*Primary Examiner*—David C. Nelms
*Assistant Examiner*—Amanda Merlino
*Attorney, Agent, or Firm*—Pamela Lau Kee

[57] ABSTRACT

The signal-to-noise ratio of the correction signal used for second harmonic interferometry is improved in two ways. First, an optical amplifier, tuned to the second harmonic frequency, is positioned in the optical path. Second, a doubling stage is positioned internal to the correction laser.

10 Claims, 6 Drawing Sheets

SIGNAL-TO-NOISE RATIO OF SECOND HARMONIC INTERFEROMETERS

FIELD OF THE INVENTION

The invention is directed towards the field of second harmonic interferometry. In particular, the invention is directed towards improving the signal-to-noise ratio of the second harmonic interferometric measurements.

BACKGROUND OF THE INVENTION

Air turbulence affects the performance of He—Ne interferometers that are used to control the wafer stage of a stepper or step and scan lithography systems. Typical magnitudes of the length measurement errors are 10–30 nm (3σ) over a 20 cm path. This measurement error results in stage positioning errors which affect the achievable overlay accuracy. By using the dispersion characteristics of air, measurements of the optical path length at multiple wavelengths can provide the information required to remove the effects of the air turbulence on the measured path length. The small optical path length difference at the two wavelengths is directly proportional to the integrated air density in the measurement path.

FIG. 1 illustrates a prior art device disclosed by Lis in U.S. Pat. No. 5,404,222, "Interferometric Measuring System with Air Turbulence Compensation", issued Apr. 4, 1995, to make a direct measurement of the path length difference using second harmonic interferometry. Frequency doubling is applied at both the input and the output of the interferometer. Input frequency doubling provides two well-separated, phase-locked wavelengths (532 nm and 266 nm) to characterize the air in the path. The output frequency doubling allows accurate measurement of the small path length difference induced by the air by measuring an optical phase difference between the light which traveled as 532 nm and the light which traveled the path as 266 nm. Collinear combination of this two-wavelength compensation system with the existing He—Ne interferometer used for length measurement provides a highly accurate system with real-time compensation for air turbulence. However, the second harmonic conversion of the fundamental frequency is inefficient and results in a poor signal-to-noise ratio in the correction signal.

Attempts to increase the signal-to-noise ratio have included applying more power to the input of the interferometer. Although the second harmonic conversion efficiency improves as more fundamental power is applied, the efficiency remains low for any laser that could be practically used in the system. In addition, the additional power increases the need for thermal cooling. The fans and the heat sources themselves often aggravate the air turbulence effect on the wafer stage of stepper or step and scan lithography system.

It would be desirable to improve the signal-to-noise ratio of the correction signal while reducing the air turbulence effect on the lithography systems. It would be a further benefit if the second harmonic conversion of the fundamental frequency were improved.

SUMMARY

The signal-to-noise ratio of the correction signal used for second harmonic interferometry is improved in two ways. First, an optical amplifier, tuned to the second harmonic frequency, is positioned in the optical path. Second, a doubling stage is positioned internal to the correction laser.

An intracavity frequency doubled laser emits a first optical beam at a fundamental frequency and a second optical beam at the second-harmonic of the fundamental frequency. The frequency doubled laser is positioned adjacent to a phase modulator. A first beam splitter is positioned near the phase modulator. A second beam splitter is positioned between a reference laser, a quarter waveplate, and a face of the first beam splitter. A stage mirror is positioned proximate to the quarter waveplate. The system is designed to measure the stage mirror position. An external doubling crystal is positioned near an opposing face of the first beam splitter. An optical amplifier, tuned to the second harmonic frequency, is positioned between the external doubling stage and a filter, such as a dichroic beamsplitter. The filter prevents the transmission of the first optical beam containing the fundamental frequency. A square law photo detector is positioned near the filter.

DETAILED DESCRIPTION OF THE DRAWINGS

Figure 1:
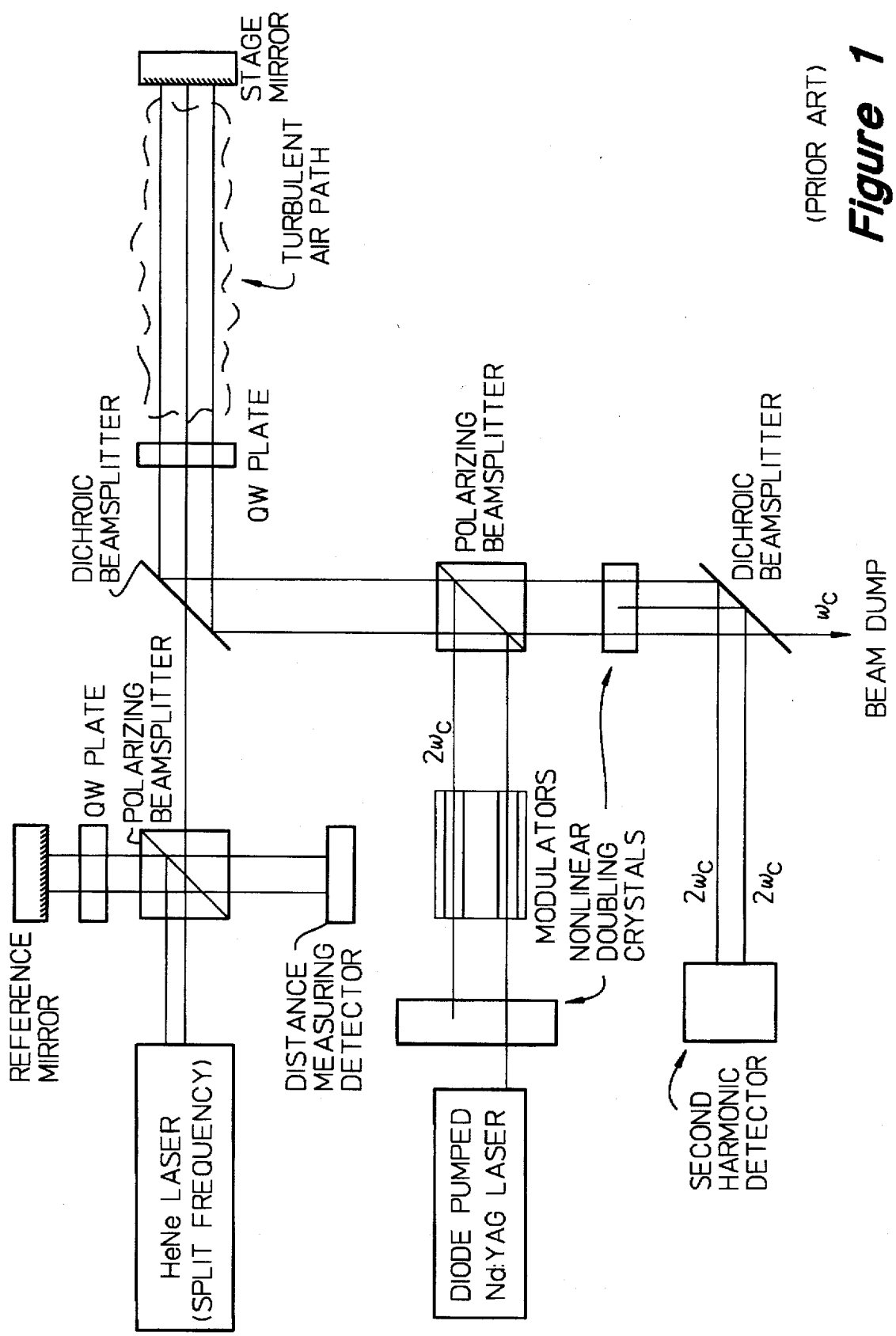
FIG. 1 illustrates an interferometer of the prior art.
Figure 2:
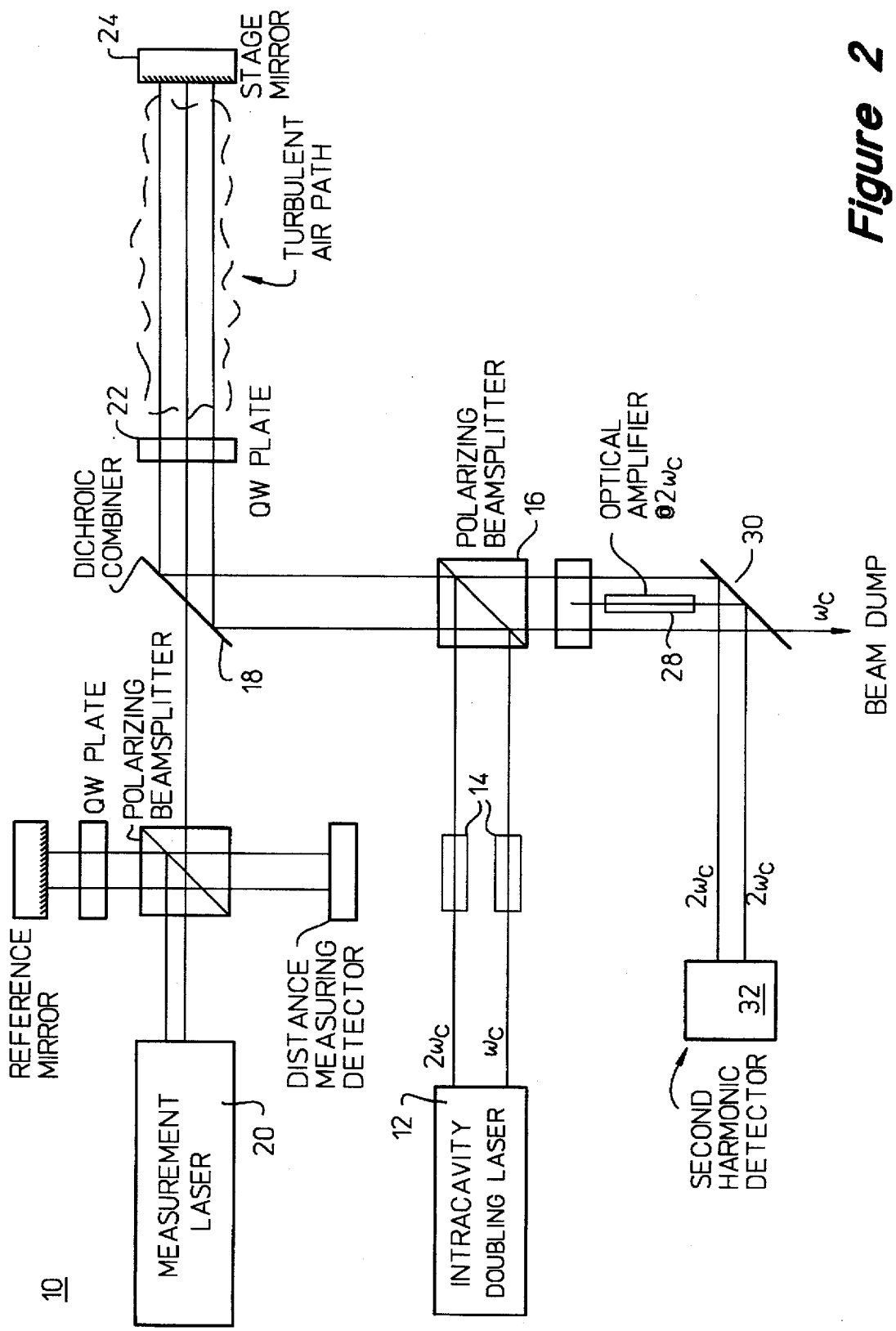
FIG. 2 illustrates an interferometer of the present invention.

FIG. 2 illustrates an interferometer of the present invention 10. An intracavity frequency doubled laser 12 emits a first optical beam at a fundamental frequency $\omega_c$ and a second optical beam at the second-harmonic of the fundamental frequency $2\omega_c$. The frequency doubled laser 12 is positioned adjacent to a phase modulator 14. The phase modulator 14 applies a phase modulation to the first and second optical beams. A first beam splitter 16 is positioned near the phase modulator 14. A second beam combiner 18 is positioned between a reference laser 20, a quarter waveplate 22, and a face of the first beam splitter 16. A stage mirror 24 is positioned proximate to the quarter waveplate 22. An external doubling crystal stage 26 is positioned near an opposing face of the first beam splitter 16. An optical amplifier 28, tuned to the second harmonic frequency $2\omega_c$, is positioned between the external doubling crystal stage 26 and a filter 30, such as an output mirror. A second harmonic detector 32 is positioned near the filter 30.

To avoid saturation, only the weak $2\omega_c$ beam generated at the end of the measurement path must pass through the optical amplifier 28. This requires at least a small amount of lateral separation. Displacement of the input beam by the width of the amplifier gain stripe (typically 50 μm) will cause this. As long as the correction beams are separated by a few mm or less, the turbulence seen along their respective paths is well correlated and the separation should cause little error.

Figure 3:
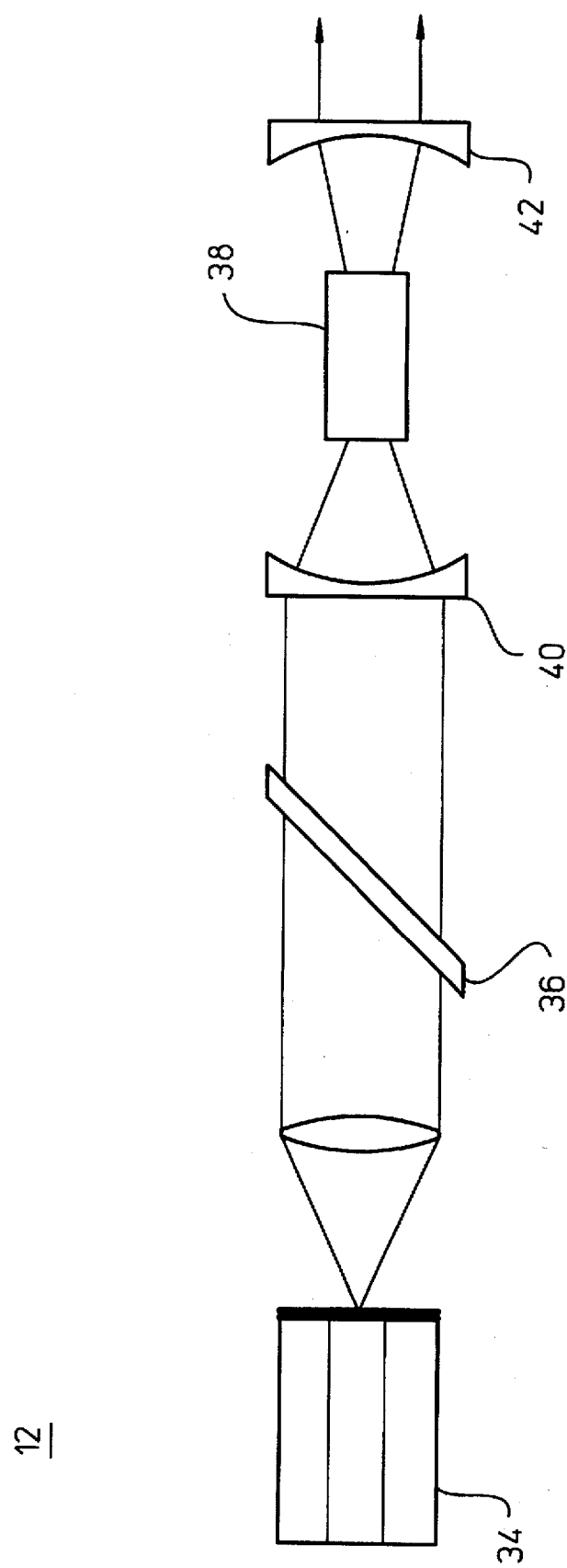
FIG. 3 illustrates an example of a correction laser shown in FIG. 2.

FIG. 3 illustrates an example of the intracavity frequency doubled laser 12 shown in FIG. 2. A semiconductor laser 34, such as an InGaAsP laser diode, having an anti-reflective coating at the output, is positioned near an external field build-up cavity through an etalon 36. The build-up cavity includes a doubling crystal 38, such as $KNbO_3$, positioned between two mirrors 40, 42.

Figure 4A:
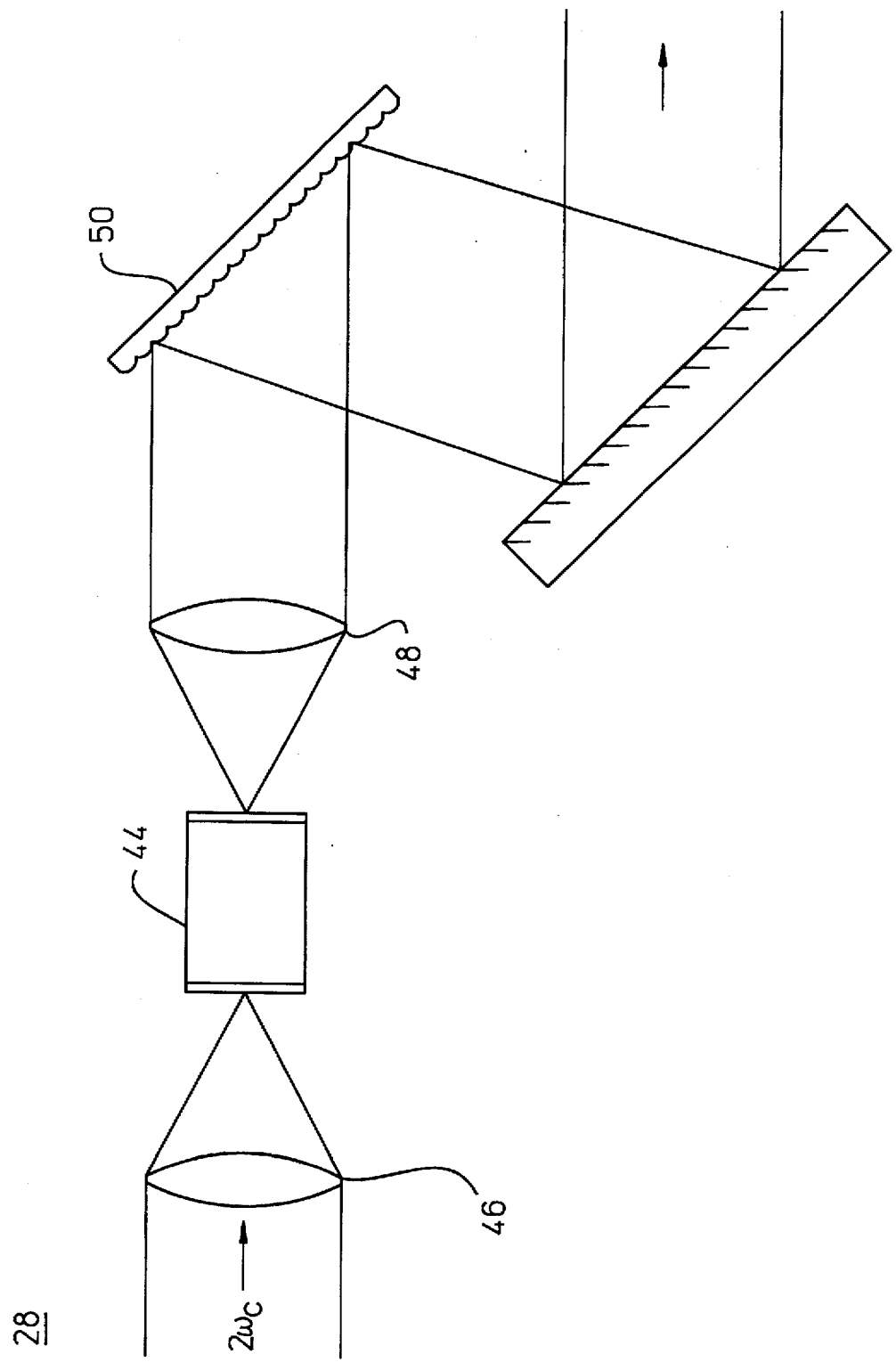
FIGS. 4A and 4B illustrates an example of an optical amplifier shown in FIG. 2.
Figure 4B:
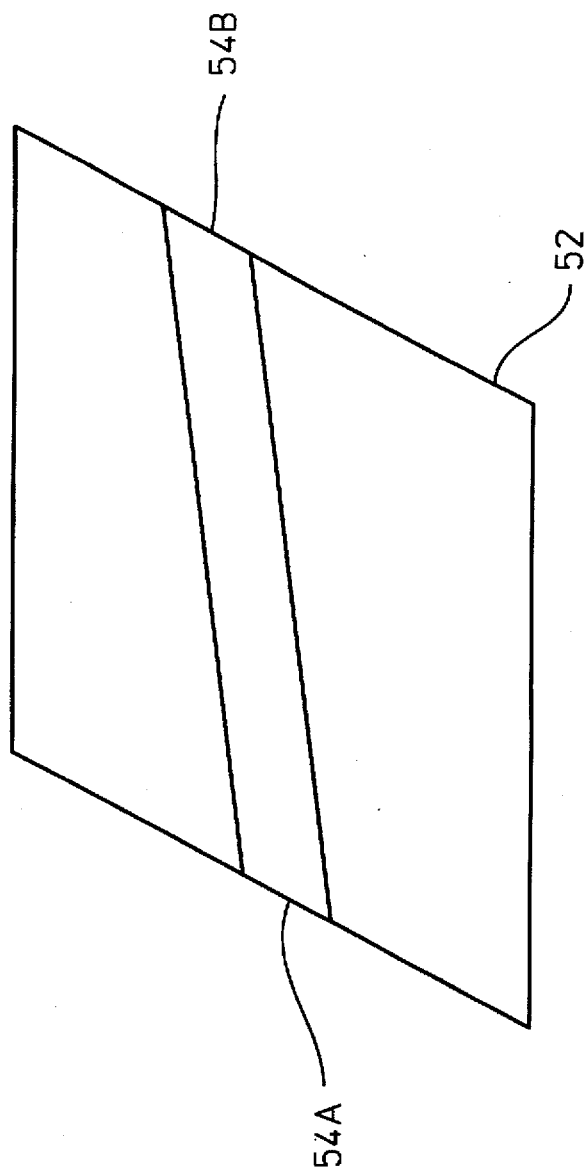

FIGS. 4A and 4B illustrate examples of an optical amplifier 28 shown in FIG. 2. In FIG. 4A, the semiconductor optical amplifier 28 is made from an optical amplifier laser 44 having anti-reflective coatings at the input and the output is positioned between two collimators 46, 48. One of the two collimators 46, 48 is positioned near a diffraction grating 50. In operation, the rate of efficiency of the second harmonic conversion is improved by boosting the amplitude explicitly using the optical amplifier laser. The diffraction grating 50 filters out the amplified spontaneous emission, i.e. minimizes all but the second harmonic frequency. Alternatively, an interference filter could be used to filter the amplified spontaneous emission.

An alternate optical amplifier, shown in FIG. 4B, can be formed from a tilted stripe amplifier 52 having optional reflective coatings 54A, 54B.

Figure 5:
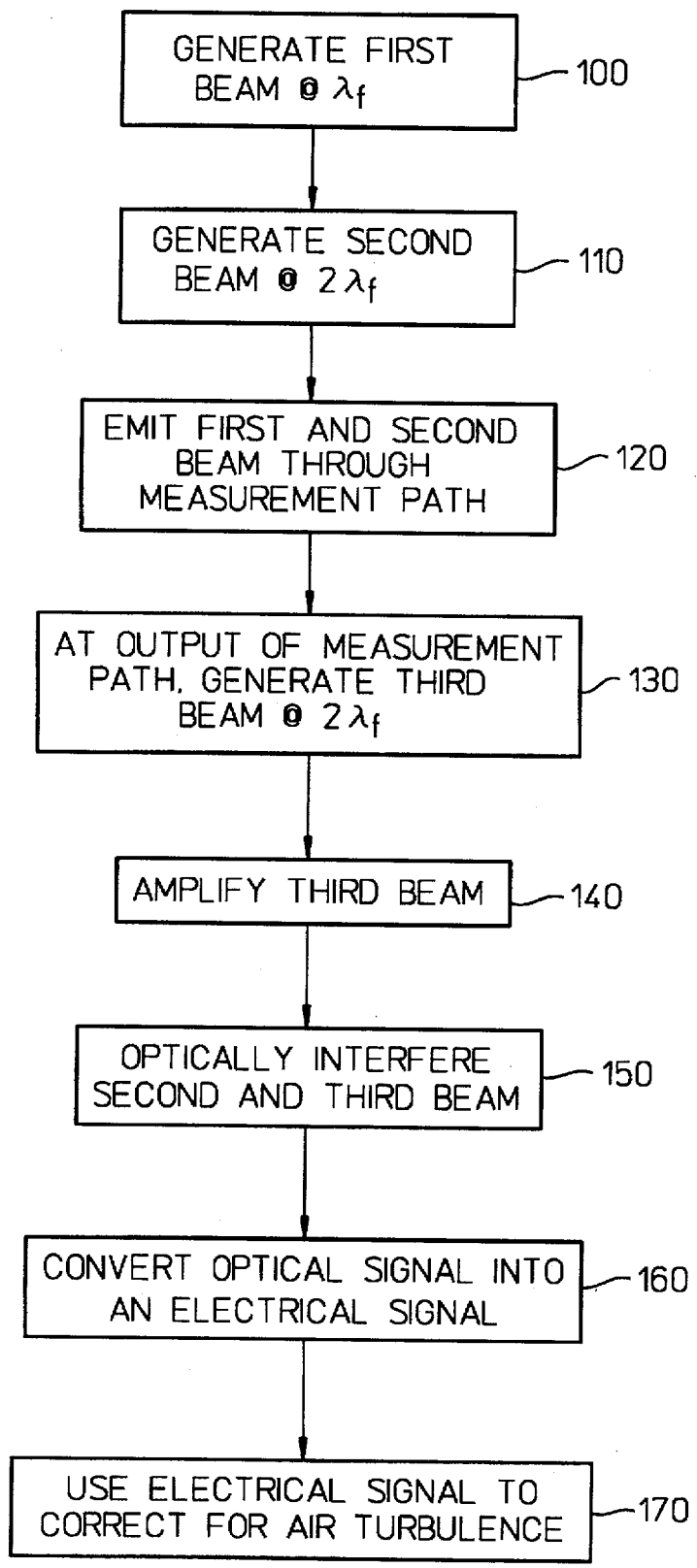
FIG. 5 illustrates a process flowchart according to the present invention.

FIG. 5 illustrates a process flowchart according to the present invention. In step 100, a first optical beam is generated at the fundamental frequency $\omega_c$. In step 110, a second optical beam is generated at the second harmonic of the fundamental frequency $2\omega_c$. In step 120, the first and second optical beams are emitted at one end of a measurement air path. In step 130, a third optical beam is generated at the second harmonic frequency $2\omega_c$ at the other end of the measurement air path. In step 140, the third optical beam is amplified. In step 150, the second and third optical beams are interfered. In step 160, the optical interference is converted into an electrical signal with a square lens photodetector. In step 170, the electrical signal is used to correct for air turbulence in the interferometric distance measurements.

Although the present invention has been described with respect to a separate measurement laser, if the intracavity doubled laser has sufficient frequency stability, the separate measurement laser can be eliminated and the dual wavelength output of a single laser can be used both for distance measurement and air turbulence correction.

I claim:

1. A correction apparatus comprising:

a doubling laser means for generating a first and a second optical beam, wherein the first optical beam is at a fundamental frequency and the second optical beam is at a second harmonic frequency;

a phase modulator, receiving the first and second optical beams, being operative to phase modulate the first and second optical beams;

a beam splitter, receiving the modulated first and second optical beams;

a doubling crystal stage, positioned near the beam splitter, being operative to generate a third beam at the second harmonic frequency;

an optical amplifier, positioned near the doubling crystal stage, being operative to amplify the amplitude of the third optical beam;

a filter, positioned near the optical amplifier, being operative to receive the first, second, and third optical beams; and to transmit the second and third optical beams; and a second harmonic detector positioned near the filter.

2. A correction apparatus, as defined in claim 1, the laser doubling means comprising:

a semiconductor laser having an anti-reflective coated output;

an etalon, positioned near the anti-reflective coated output; and a field build-up section that includes, two mirrors, and a doubling crystal positioned between the two mirrors.

3. A correction apparatus, as defined in claim 2, the optical amplifier comprising:

two collimators;

a semiconductor laser, positioned between the two collimators; and an optical filter, positioned near one of the two collimators.

4. A correction apparatus, as defined in claim 3, wherein the optical filter is a diffraction grating optimized at the second harmonic frequency signal.

5. A correction apparatus, as defined in claim 3, wherein the optical filter is an interference filter optimized at the second harmonic frequency signal.

6. A correction apparatus, as defined in claim 3, wherein:

the semiconductor laser of the laser doubling means is an InGaAsP diode laser at 1300 nm; and the semiconductor laser of the optical amplifier is an InGaAlP diode laser at 650 nm.

7. An apparatus, as defined in claim 1, the optical amplifier comprising:

two collimators;

a semiconductor laser, positioned between the two collimators; and an optical filter, positioned near one of the two collimators.

8. A correction apparatus, as defined in claim 7, wherein the optical filter is a diffraction grating optimized at the second harmonic frequency signal.

9. A correction apparatus, as defined in claim 7, wherein the optical filter is an interference filter optimized at the second harmonic frequency signal.

10. A method for correcting air turbulence measurements comprising the steps of:

generating a first optical beam at a fundamental frequency;

generating a second optical beam at the second harmonic of the fundamental frequency; and transmitting the first and the second optical beam at a first end of a measurement path;

generating a third optical beam at the second harmonic of the fundamental frequency at a second end of the measurement path;

amplifying the third optical beam;

interfering the second and third optical beams and generating an optical signal;

converting the optical signal into an electrical signal; and applying the electrical signal to correct for air turbulence along the measurement path.

* * * * *